US009148718B2

(12) United States Patent
Breece, III et al.

(10) Patent No.: US 9,148,718 B2
(45) Date of Patent: Sep. 29, 2015

(54) GROUNDING CIRCUIT FOR ALTERNATE AUDIO PLUG DESIGNS

(75) Inventors: David C. Breece, III, Sunnyvale, CA (US); Cara S. Yang, Mountain View, CA (US); Nathan Johanningsmeier, San Jose, CA (US); Kavitha Srinivasan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 578 days.

(21) Appl. No.: 13/492,900

(22) Filed: Jun. 10, 2012

(65) Prior Publication Data

US 2013/0329916 A1 Dec. 12, 2013

(51) Int. Cl.
*H04R 3/00* (2006.01)
*H04R 1/10* (2006.01)
*H04B 15/00* (2006.01)

(52) U.S. Cl.
CPC .......... *H04R 1/1041* (2013.01); *H04R 2420/05* (2013.01)

(58) Field of Classification Search
CPC . H03K 3/001; H03K 2017/6875; H04R 3/00; H04R 1/1041; H04R 2420/05
USPC ........ 381/111, 122, 71.6, 74, 94.1–94.9, 309, 381/379, 95; 327/379, 540, 541, 536; 439/668
See application file for complete search history.

(56) References Cited

U.S. PATENT DOCUMENTS 7,705,659 B1 * 4/2010 Liu .............................. 327/530
2011/0268289 A1 * 11/2011 Baranwal et al. ............... 381/74
2012/0144072 A1 * 6/2012 Hansson et al. ................ 710/15

* cited by examiner

*Primary Examiner* — Vivian Chin
*Assistant Examiner* — Ammar Hamid
(74) *Attorney, Agent, or Firm* — Kilpatrick Townsend & Stockton LLP

(57) ABSTRACT

Circuits, methods, and apparatus for grounding contacts in an audio jack. One example may provide a driver, such as a charge pump, driving a first depletion mode transistor coupled between a first contact in an audio jack and ground, and a second depletion mode transistor coupled between a second contact in the audio jack and ground. The first depletion mode transistor and second depletion mode transistor may be p-channel transistors or n-channel transistors.

23 Claims, 5 Drawing Sheets

GROUNDING CIRCUIT FOR ALTERNATE AUDIO PLUG DESIGNS

BACKGROUND

Electronic devices, such as portable media players, storage devices, tablets, netbooks, laptops, desktops, all-in-one computers, cell, media, and smart phones, televisions and other display devices, navigation systems, and other devices have become ubiquitous in recent years. These devices often include an audio jack through which they receive and/or provide audio information. The audio jacks may include, or be connected to, electronic circuitry such as audio drivers for driving headphones or speakers, audio receivers for receiving audio signals from a microphone, and others. The audio jacks may be arranged to receive audio plugs that may be connected through audio cables to other electronic circuits such as home stereos, powered speakers, headphones or headsets, audio receivers, and other circuits.

These audio plugs may be electrical audio plugs. That is, they may include a number of ring-shaped contacts along their lengths. These contacts may connect to conductors in a cable attached to the audio plug. Contacts for three-pole audio plugs may include left audio, right audio, and ground. Contacts for four-pole audio plugs may include contacts for left audio, right audio, ground, and microphone.

These four-pole audio plug contacts may be configured in a conventional manner. That is, a tip of the audio plug may be a left audio channel contact, followed by a right audio channel, ground, and microphone contacts.

However, some four-pole audio plugs may be configured in an alternate manner. While the tip and following contacts remain a left audio channel contact and a right audio channel contact, the last two contacts are reversed relative to the conventional audio plug. Specifically, the next contact is a microphone contact, followed by ground.

This reversal, as well as the possibility of three or four-pole audio plugs, has necessitated the development of detection circuitry to be included with an audio jack to determine which type of audio plug is inserted. This detection circuit may drive a grounding circuit to ground the appropriate contact in the audio jack. Unfortunately, when power is removed, the grounding circuit may be removed as well. Under certain circumstances, this may lead to excessive ground noise in another electronic connected to the audio jack through an audio cable.

Thus, what is needed are circuits, methods, and apparatus for grounding contacts in an audio jack to avoid this ground noise.

SUMMARY

Accordingly, embodiments of the present invention provide circuits, methods, and apparatus for grounding contacts in an audio jack. An illustrative embodiment of the present invention may provide a driver, such as a charge pump, driving a first depletion mode transistor coupled between a first contact in an audio jack and ground, and a second depletion mode transistor coupled between a second contact in the audio jack and ground. The first depletion mode transistor and second depletion mode transistor may be p-channel transistors or n-channel transistors.

The charge pump may be powered by an input supply voltage, for example, from an interface circuit. When the charge pump is powered up, it may provide a voltage to the gate of the first depletion mode transistor and the gate of the second depletion mode transistor. This voltage may turn off the first depletion mode transistor and the second depletion mode transistor. That is, it may place the first depletion mode transistor and the second depletion mode transistor in a high-impedance state. The voltage provided by the charge pump may be a positive voltage or a negative voltage, depending on whether the first depletion mode transistor and the second depletion mode transistor are p-channel transistors or n-channel transistors. The charge pump may be powered up when an electronic device housing the audio jack is powered up and audio circuitry associated with the audio jack is active. In other embodiments, the charge pump may be powered up at other times, such as whenever the electronic device is powered up.

When the electronic device is powered down, the input supply voltage may go to ground or a near ground potential. The output of the charge pump may decay to ground, thereby allowing the first depletion mode transistor and the second depletion mode transistor to turn on. That is, it may allow the first depletion mode transistor and the second depletion mode transistor to conduct. When the audio plug is a three-pole plug, this may ground the ground contact. When the audio plug is a four-pole plug, this may connect the two contacts that may be ground or microphone in the audio jack to ground. The charge pump may be powered down when the electronic device is powered off. In various embodiments of the present invention, the charge pump may be powered down at other times. For example, the charge pump may also be powered down when the electronic device is in a sleep state or at other times, such as when audio circuitry is inactive.

Another illustrative embodiment of the present invention may include circuitry to determine whether an audio plug inserted in an audio jack is a three-pole audio plug or a four-pole audio plug, and if it is a four-pole audio plug, whether it is of a conventional or alternate design. This embodiment may further provide control logic having an input for receiving this information. This information may be provided to the control logic using an I2C logic interface. The control logic may control a multiplexer to connect microphone circuitry to either a first contact or a second contact in the audio jack, where the first contact and the second contact are the two contacts that may be ground or microphone contacts. The control logic may further provide the input power supply to the charge pump that drives the first depletion mode transistor and the second depletion mode transistor.

In a specific embodiment of the present invention, the control logic may also control enhancement mode transistors coupled between the first contact in the audio jack and ground, and the second contact in the audio jack and ground, where the first contact and the second contact are the two contacts that may be ground or microphone contacts. Specifically, in the power-on mode when the first depletion mode transistor and the second depletion mode transistor are off, if the audio plug is a three-pole plug, the control logic may turn on both the enhancement mode transistors, thereby grounding the ground contact. In other embodiments of the present invention, one of the enhancement mode transistors may be turned on, again grounding the ground contact. In the power-on mode where the audio plug is a four-pole plug, the control logic may turn on either a first enhancement transistor or a second enhancement transistor to short either the first contact in the audio jack or the second contact in the audio jack to ground, as appropriate given whether the audio plug inserted in the audio jack is of a conventional or alternate design.

In some embodiments of the present invention, the depletion mode transistor that is in parallel with the on enhancement mode transistor may also be turned on to reduce ground impedance. In these situations, the presence of a conducting depletion mode transistor may provide a variation in ground impedance that may create noise. Accordingly, in other embodiments of the present invention, the depletion mode transistor may be kept off.

In these various embodiments, the depletion mode transistors may be turned on before the enhancement mode transistor is turned off. Similarly, the enhancement mode transistor may be turned on before the depletion mode transistor is turned off. This make-before-break arrangement may ensure that a path to ground is always present for the appropriate audio jack contact.

Another illustrative embodiment of the present invention may provide an integrated circuit including a charge pump having an output coupled to a gate of a first depletion mode transistor and a gate of a second depletion mode transistor. A first source/drain region of the first depletion mode transistor and the second depletion mode transistor may be coupled to pins of the integrated circuit. A second source/drain region of the first depletion mode transistor and the second depletion mode transistor may be coupled to a ground pin. The charge pump may receive an input power supply on a power pin. The charge pump may receive an input power supply level select input on a pin. Another pin of the integrated circuit may be provided for a capacitor to suppress noise on the voltage provided by the charge pump to the gates of the first depletion mode transistor and the second depletion mode transistor.

Embodiments of the present invention may be employed in various electronic devices, such as portable media players, storage devices, tablets, netbooks, laptops, desktops, all-in-one computers, cell, media, and smart phones, televisions and other display devices, navigation systems, and other devices Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
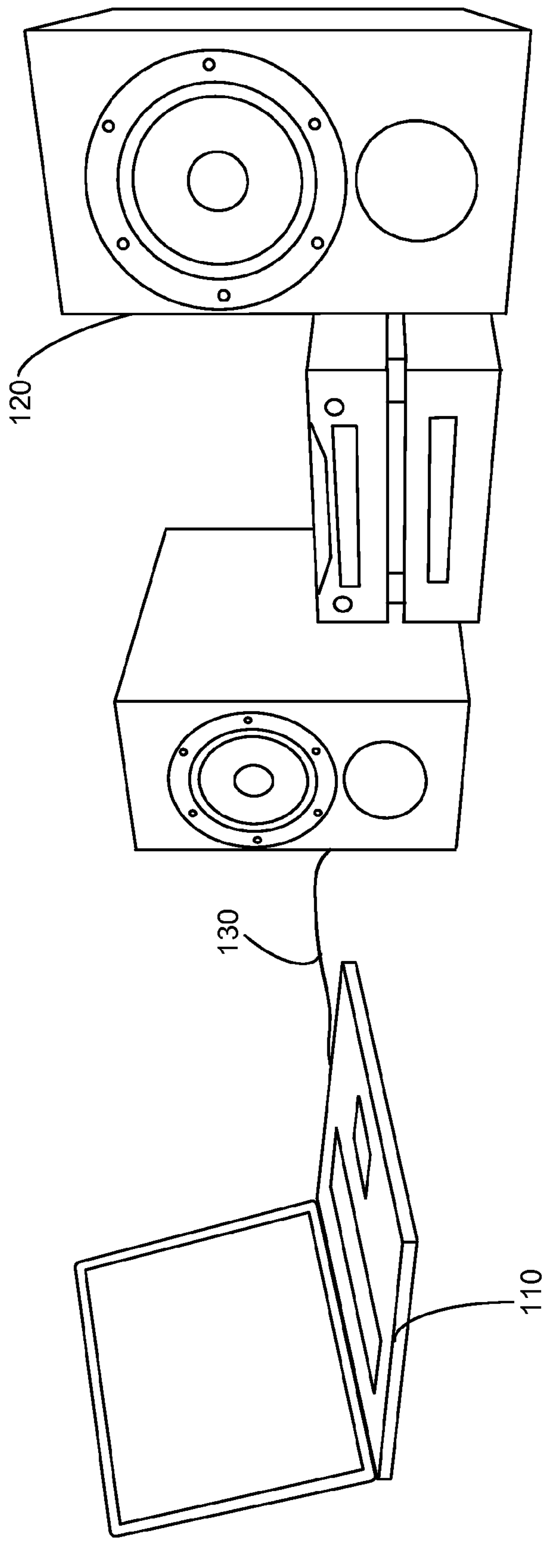
FIG. 1 illustrates an electronic system that may be improved by the incorporation of an embodiment of the present invention.

FIG. 1 illustrates an electronic system that may be improved by the incorporation of an embodiment of the present invention. This figure, as with the other included figures, is shown for illustrative purposes and does not limit either the possible embodiments of the present invention or the claims.

This electronic system may include a portable computer 110 coupled to a home stereo system 120 via audio cable 130. Such a configuration may be used to play music or other audio content stored on portable computer 110 over home stereo system 120.

Audio cable 130 may include an audio plug, which may be plugged into an audio jack on portable computer 110. The audio plug that may be plugged into an audio jack on portable computer 110 may be a three-pole plug or it may be a four-pole plug. Again, if the audio plug is a four-pole plug, it may be a conventional audio plug or it may be of an alternate design. Specifically, the two contacts on the audio plug furthest from the tip may be, in order, microphone then ground, or they may be ground then microphone.

Accordingly, portable computer 110 may include detect circuitry to determine how many poles the audio plug has, and which configuration the audio plug is using if it is a four-pole plug. If the audio plug is a three-pole plug, the ground contact may be grounded. If the plug is a four-pole plug, then depending on the configuration, the appropriate one of the two contacts may be grounded.

A problem with this arrangement may occur when portable computer 110 is powered off while home stereo system 120 remains powered on. Specifically, the circuitry creating the ground connection in portal computer 110 may lose power, and the ground connection may become an open circuit. This floating ground may cause noise from the power supply, such as a hum or noise at 60 Hz, to be amplified and output by the speakers associated with home stereo 120.

One solution may be to power the circuitry that creates the ground connection with a battery in portable computer 110. However, this may draw power from the battery, thereby reducing battery lifetime. Accordingly, embodiments of the present invention may provide circuitry for creating a ground connection that does not require power from the battery in portable computer 110.

In this embodiment of the present invention, portable computer 110 is shown as being connected to a home stereo system 120. In other embodiments of the present invention, portable computer 110 may be connected to other types of powered speakers, home theater systems, and other grounded speaker systems. Also, portable computer 110 may be another type of computer, media player, or audio source. An example is shown in the following figure.

Figure 2:
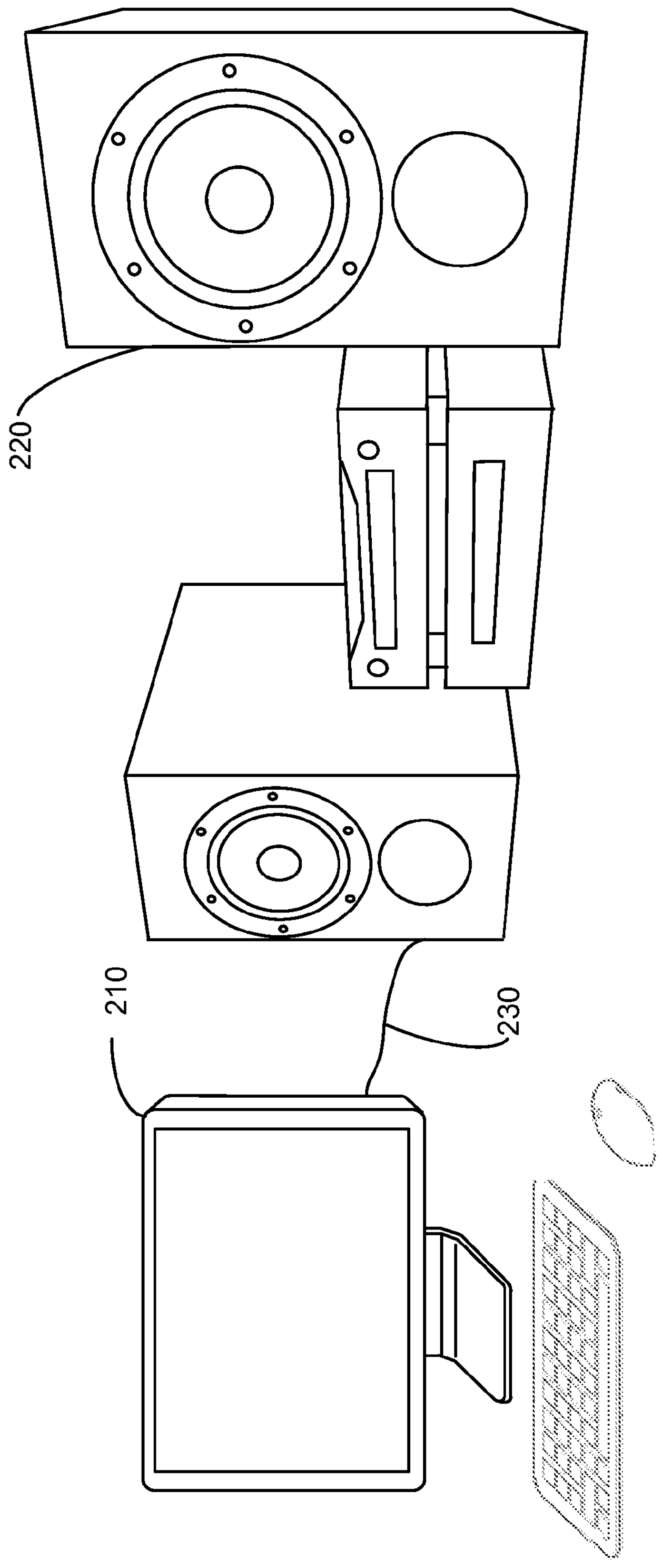
FIG. 2 illustrates another electronic system that may be improved by the incorporation of an embodiment of the present invention.

FIG. 2 illustrates all-in-one computer 210 providing audio information to home stereo system 220 over audio cable 230. Again, when all-in-one computer 210 is powered down while home stereo system 220 is powered up, a floating ground connection in all-in-one computer 210 may generate power supply noise over the speakers of home stereo system 220. In this example, all-in-one computer 210 may not include a battery that can be used to power grounding circuit. Accordingly, embodiments of the present invention may provide circuitry for creating a ground connection that does not require power. Some examples are shown in the following figures.

Figure 3:
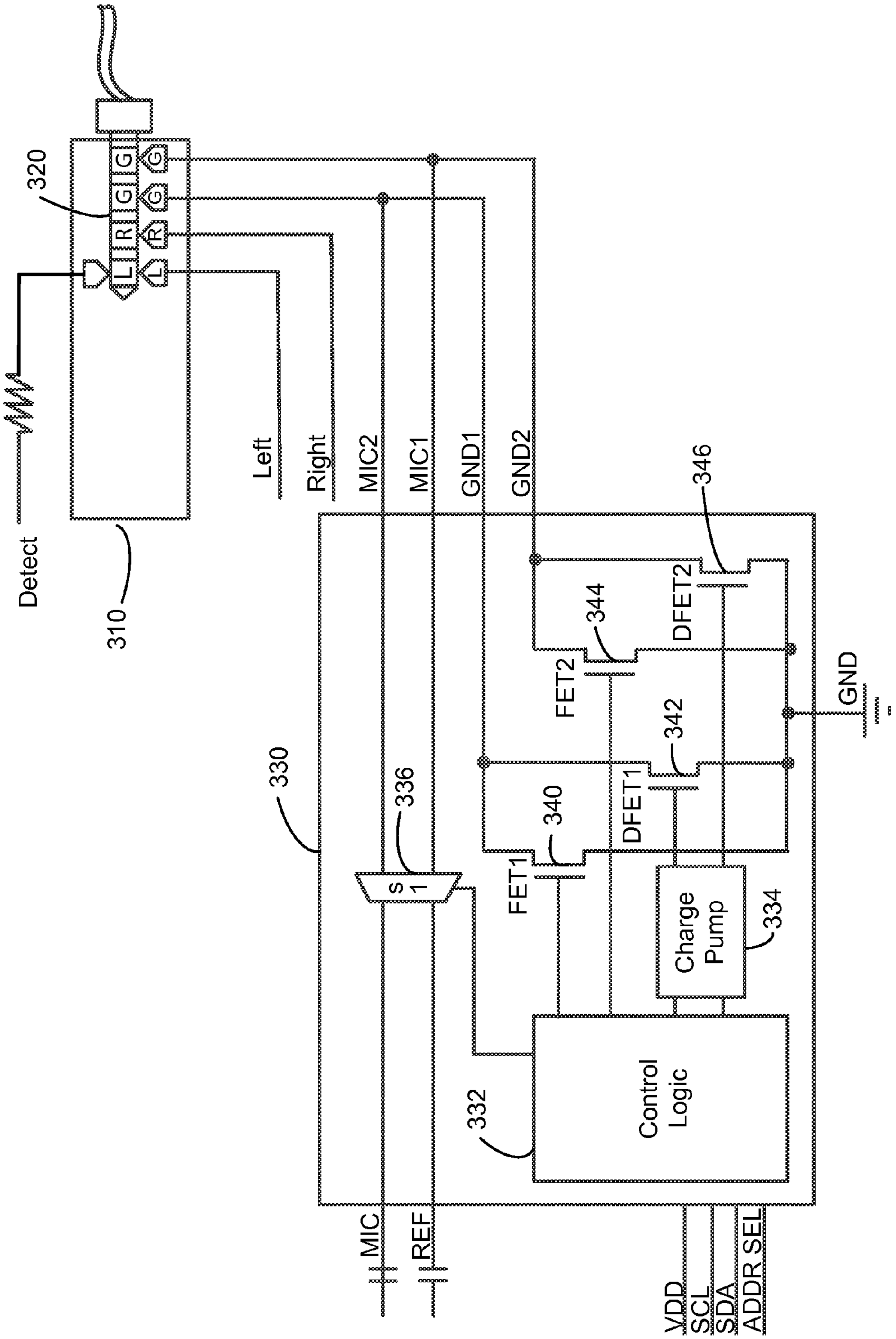
FIG. 3 illustrates grounding and related circuitry for an audio jack according to an embodiment of the present invention.

FIG. 3 illustrates grounding and related circuitry for an audio jack according to an embodiment of the present invention. In this example, audio plug 320 is inserted into audio jack 310. Audio jack 310 may be located in a portable computer, such as portable computer 110, an all-in-one computer, such as all-in-one computer 210, or another type of electronic device. Audio plug 330 may connect to a home stereo system, such as home stereo systems 120 or 220, or other powered or grounded speakers.

Circuitry 330 may operate in one of two modes. In a power-on mode, an appropriate one or both of the possible ground contacts in audio jack 310 may be grounded. In a power-off mode, both of the possible ground contacts in audio jack 310 may be grounded. In this way, in the power-off mode, the ground connection to the appropriate audio plug 320 contact remains grounded, thereby reducing power supply noise being output by speakers of home stereo systems 120 or 220.

In various embodiments of the present invention, circuitry 330 may enter the power-on mode at different times. For example, circuitry 330 may be in the power-on mode whenever power is applied to the electronic device that includes this circuitry. In other embodiments of the present invention, the power-on mode is entered only when the associated audio circuitry is active, while in other embodiments of the present invention, the power-on mode may be entered at other times. In other embodiments of the present invention, the power-off mode may be entered only when the device that includes this circuitry is powered off, while in other embodiments of the present invention, the power-off mode may also be entered when the device enters a sleep state, or at other appropriate times.

Circuitry 330 may be connected to contacts in audio jack 310. These contacts in audio jack 310 may form electrical connections with corresponding contacts on audio plug 320. Circuitry 330 may include multiplexing circuitry 336 for multiplexing microphone and ground circuitry to appropriate contacts in audio jack 310, depending on whether audio plug 320 is a four-pole audio plug of a conventional or alternate configuration. Multiplexing circuitry 336 may be under the control of control logic 332. Specifically, when it is determined that a four-pole audio plug 320 is inserted in audio receptacle 310, detect circuitry may determine whether a conventional or alternate audio plug is present. This circuitry may instruct control logic 322 to configure multiplexing circuitry 336 to couple microphone and ground circuitry to appropriate contacts in audio jack 310. In various embodiments of the present invention, this detect circuitry may be included in CODEC (coding/decoding) circuit, or in other circuitry associated with the audio jack 310.

Circuitry 330 may also include enhancement transistors 340 and 344. In the power-on mode, when audio plug 320 is determined to be a three-pole plug, control logic 332 may drive the gates of both enhancement-mode transistors 340 and 344 high, thereby turning on these transistors and grounding the ground contact in audio jack 310. In other embodiments of the present invention, control logic 332 may drive the gates of either of the enhancement-mode transistors 340 and 344 high, thereby turning on one of these transistors and grounding the ground contact in audio jack 310.

In the power-on mode, when audio plug 320 is determined to be a four-pole plug, control logic 332 may drive a gate of either transistor 340 or transistor 344 high as appropriate, thereby turning one of these transistors and grounding the appropriate contact in audio jack 310. In the power-off mode, transistors 340 and 344 may be off.

Control logic 332 may also control charge pump 334. In the power-on mode, whether audio plug 320 is determined to be a three-pole or four-pole plug, charge pump 334 may drive the gates of depletion mode transistors 342 and 346 to a voltage such that depletion mode transistors 342 and 346 are off. That is, charge pump 334 may drive gates of depletion mode transistors 342 and 346 to a voltage such that depletion mode transistors 342 and 346 are nonconducting and are in a high-impedance state. In various embodiments of the present invention, this voltage may be positive or negative, depending on whether p-channel depletion mode transistors or n-channel depletion mode transistors are used. Control logic 332 may be under the control of I2C data pins SCL and SDA. Since other devices may be on the I2C data bus, an address select line may be used to identify control logic 332.

While in this example, in the power-on mode, depletion mode transistors 342 and 346 are not used, that is, they are off, in other embodiments of the present invention, the depletion mode transistor corresponding to an enhancement mode device that is on may also be turned on such that it is conducting. In these embodiments of the present invention, care should be taken that variations in the output impedance of the depletion mode device do not create noise on the corresponding ground line, which may lead to noise over the speakers of home stereo system 120 or 220.

In the power-off mode, whether audio plug 320 is determined to be a three-pole or four-pole plug, charge pump 334 may allow the gate voltages for depletion mode transistors 342 and 346 to fall to a potential near ground. Accordingly, depletion mode transistors 342 and 346 turn on, thereby grounding the corresponding contacts in audio jack 310. That is, transistors 342 and 346 conduct, and thereby ground the corresponding contacts in audio jack 310. This, in turn, may provide a ground path to help reduce power supply noise on the speakers of home stereo system 120 or 220.

Again, embodiments of the present invention may include depletion mode transistors, such as depletion mode transistors 342 and 346. They may also include enhancement mode transistors, such as enhancement mode transistors 340 and 344. These depletion mode and enhancement mode transistors may be p-channel or n-channel transistors. In other embodiments of the present invention, these transistors may be replaced or supplemented by other circuits including active and/or passive components. They may also be, or include, other types of transistors that are currently available under development, or that will be developed.

Various embodiments of the present invention may provide an integrated circuit including a charge pump and depletion mode transistors. Examples are shown in the following figures.

Figure 4:
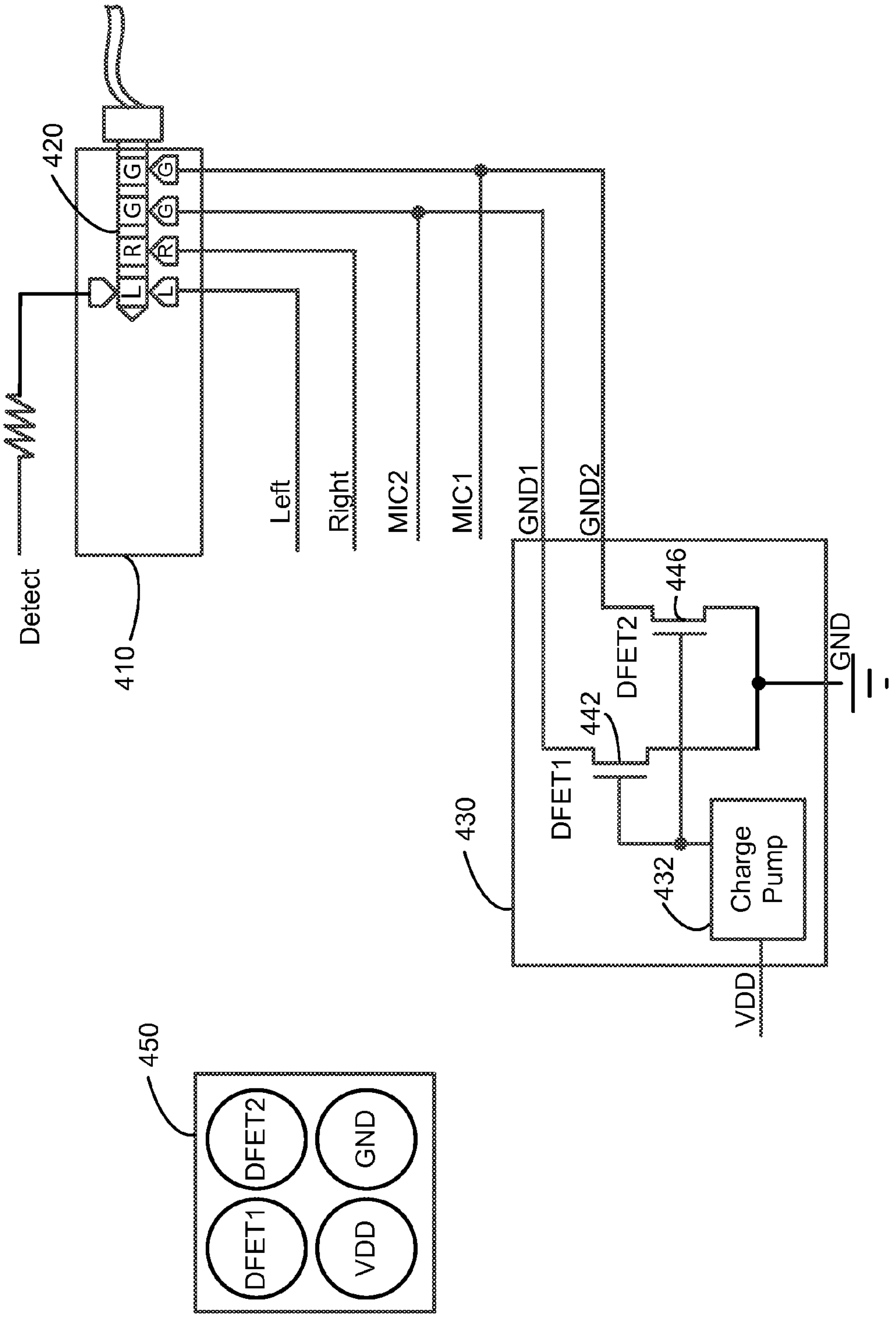
FIG. 4 illustrates an integrated circuit according to an embodiment of the present invention.

FIG. 4 illustrates an integrated circuit according to an embodiment of the present invention. In this example, integrated circuit 430 is coupled to terminals in audio jack 410. Audio plug 420 is inserted into the receptacle 410. Integrated circuit 430 may include charge pump 432 and depletion mode transistors 442 and 446. Depletion mode transistor 442 may have a first source/drain region connected to a first contact in audio jack 410, and a second source/drain region coupled to ground. Depletion mode transistor 446 may have a first source/drain region coupled to a second contact in audio jack 410, and a second source/drain region coupled to ground. Gates of these depletion mode transistors may be driven by charge pump 432. Specifically, when an input power supply VDD is received at power supply terminal VDD, charge pump 432 may provide a voltage to turn off depletion mode transistors 442 and 446. A pinout for integrated circuit 430 is shown as pinout 450.

Again, in the power on mode, an input power supply VDD may be received by charge pump 432 at power supply terminal VDD, which may provide a voltage to gates of depletion mode transistors 442 and 446. Noise on the voltage at the gates of depletion mode transistors 442 and 446 may couple through the gate/drain capacitance of the transistors to the contacts in audio jack 410. This again may appear as noise on speakers of home stereo system 120 or 220. Accordingly, embodiments of the present invention may employ a bypass capacitor to suppress this noise. An example is shown in the following figure.

Figure 5:
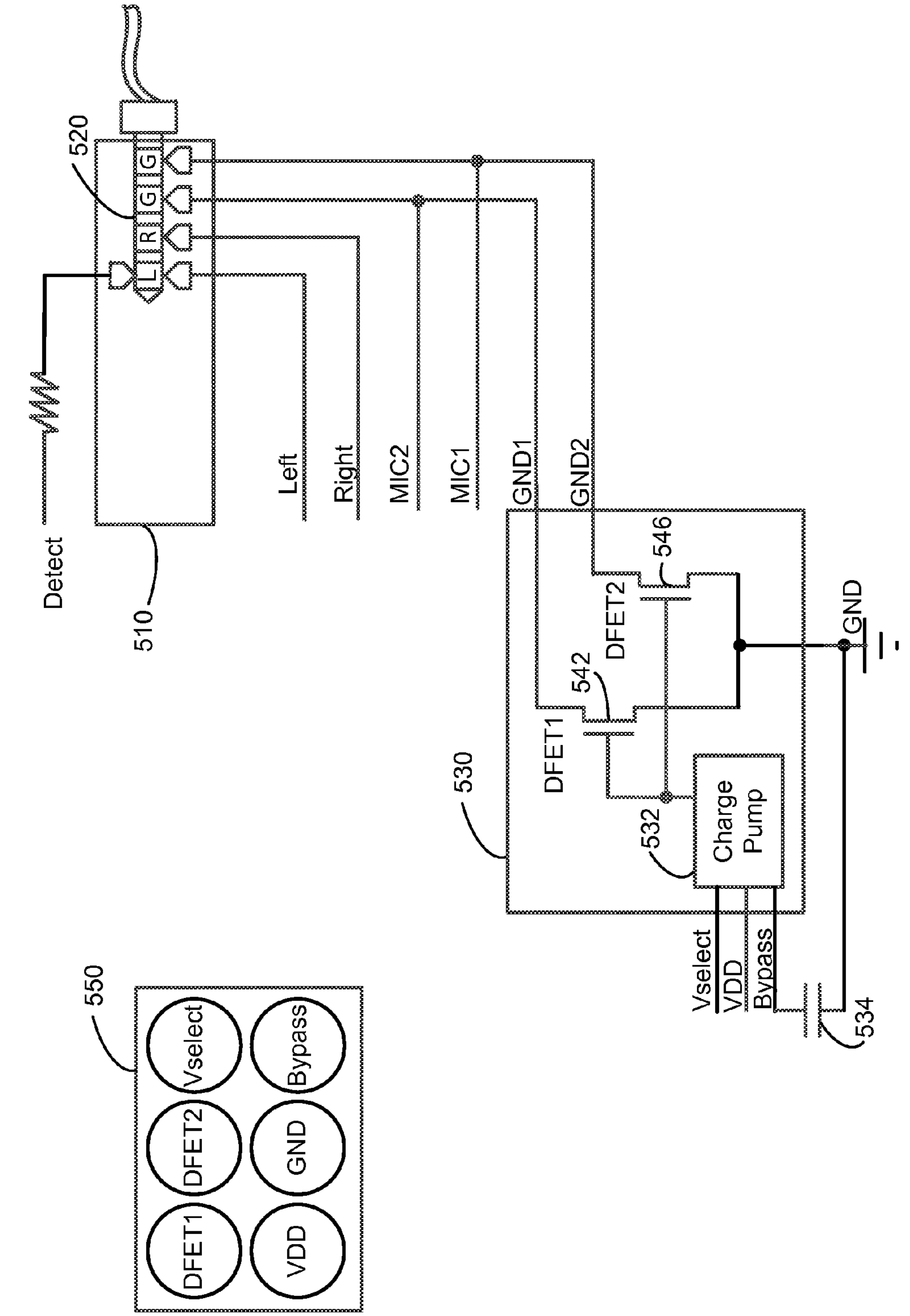
FIG. 5 illustrates another integrated circuit according to an embodiment of the present invention.

FIG. 5 illustrates another integrated circuit according to an embodiment of the present invention. In this example, charge pump 532 may include an additional pin to connect to a bypass capacitor 534. This bypass capacitor may be used to suppress noise at the gates of depletion mode transistors 542 and 546 in the power-on mode. Charge pump 532 may also receive a voltage select signal Vselect. This select signal may identify a voltage level for input power supply VDD. A pinout for integrated circuit 530 is shown as pinout 550.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An electronic device comprising:

an audio jack comprising a first contact and a second contact;

audio circuitry comprising a microphone circuit;

multiplexing circuitry to couple the microphone circuitry to the first contact or to the second contact;

a first depletion mode transistor coupled between the first contact and ground; and a second depletion mode transistor coupled between the second contact and ground;

wherein the first depletion mode transistor and the second depletion mode transistor are off when the electronic device is powered on and the audio circuit is active, and the first depletion mode transistor and the second depletion mode transistor are on when the electronic device is powered off.

2. The electronic device of claim 1 wherein the first depletion mode transistor is a p-channel depletion mode transistor.

3. The electronic device of claim 1 wherein the first depletion mode transistor is an n-channel depletion mode transistor.

4. The electronic device of claim 1 wherein the first depletion mode transistor and the second depletion mode transistor are on when the electronic device is in a sleep state.

5. The electronic device of claim 1 further comprising a control circuit to turn off the first depletion mode transistor and the second depletion mode transistor when the electronic device is powered on and the audio circuit is active, and to allow the first depletion mode transistor and the second depletion mode transistor to turn on when the electronic device is powered off.

6. The electronic device of claim 1 further comprising a charge pump to drive a gate of the first depletion mode transistor and a gate of the second depletion mode transistor to a positive voltage when the electronic device is powered on.

7. The electronic device of claim 1 further comprising a charge pump to drive a gate of the first depletion mode transistor and a gate of the second depletion mode transistor to a positive voltage when the electronic device is powered on and the audio circuit is active.

8. The electronic device of claim 1 further comprising a charge pump to drive a gate of the first depletion mode transistor and a gate of the second depletion mode transistor to a negative voltage when the electronic device is powered on and the audio circuit is active.

9. The electronic device of claim 7 further comprising a bypass capacitor to suppress noise on the positive voltage.

10. An integrated circuit comprising:

a first depletion mode transistor having a first source/drain region coupled to a first pad and a second source drain/region coupled to a ground pad;

a second depletion mode transistor having a first source/drain region coupled to a second pad and a second source drain/region coupled to a ground pad; and a charge pump having an output coupled to a gate of the first depletion mode transistor and a gate of the second depletion mode transistor, and further coupled to receive a first power supply.

11. The integrated circuit of claim 10 wherein the first depletion mode transistor is a p-channel depletion mode transistor.

12. The integrated circuit of claim 10 wherein the first depletion mode transistor is an n-channel depletion mode transistor.

13. The integrated circuit of claim 10 wherein when the first power supply is a positive voltage, the output of the charge pump turns off the first depletion mode transistor and the second depletion mode transistor.

14. The integrated circuit of claim 13 wherein when the first power supply is near ground, the output of the charge pump allows the first depletion mode transistor and the second depletion mode transistor to turn on.

15. The integrated circuit of claim 10 wherein the charge pump is further coupled to receive a select signal indicating a voltage level of the first power supply.

16. The integrated circuit of claim 10 wherein the charge pump is further coupled to a pad for a bypass capacitor.

17. A method of selectively grounding a contact in an audio jack comprising:

receiving a first voltage at a first power supply terminal;

providing a second voltage to a gate of a first depletion mode transistor and a gate of a second depletion mode transistor such that the first depletion mode transistor and the second depletion mode transistor are off;

receiving a ground level voltage at the first power supply terminal; and providing a ground level voltage to a gate of a first depletion mode transistor and a gate of a second depletion mode transistor such that the first depletion mode transistor and the second depletion mode transistor are on and a first contact and a second contact in an audio jack are grounded.

18. The method of claim 17 wherein the first depletion mode transistor is a p-channel depletion mode transistor.

19. The method of claim 17 wherein the first depletion mode transistor is an n-channel depletion mode transistor.

20. The method of claim 17 wherein a ground level signal is received at the first power supply terminal when an electronic device housing the first depletion mode transistor and the second depletion mode transistor is powered off.

21. The method of claim 17 wherein a ground level signal is received at the first power supply terminal when an electronic device housing the first depletion mode transistor and the second depletion mode transistor is in a sleep mode.

22. The electronic device of claim 1 further comprising:

a first enhancement mode transistor coupled between the first contact and ground; and a second enhancement mode transistor coupled between the second contact and ground.

23. The integrated circuit of claim 10 wherein the charge pump output is directly connected to a gate of the first depletion mode transistor and a gate of the second depletion mode transistor.

* * * * *